Figure 1:
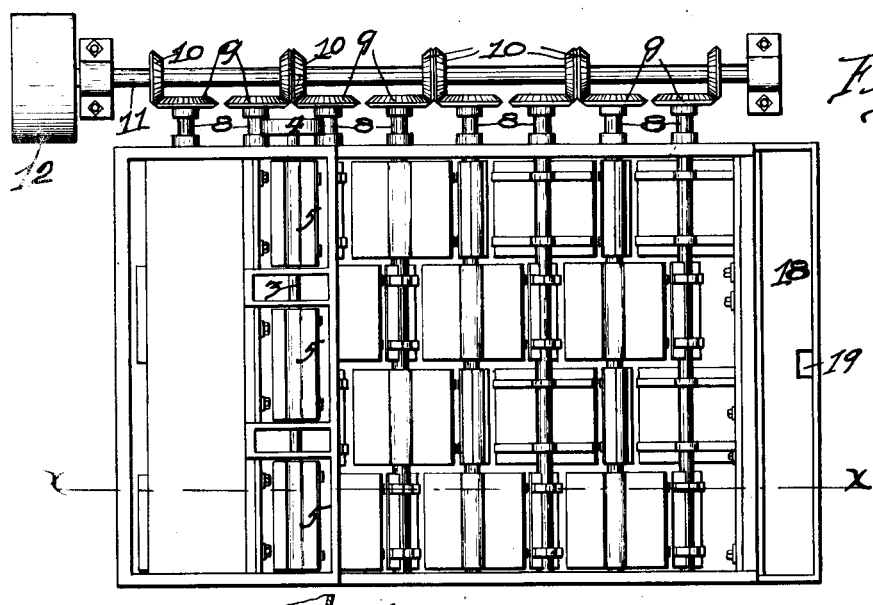

A. W. H. LENDERS.
GERM SEPARATOR.
APPLICATION FILED MAY 11, 1914.

1,194,399.

Patented Aug. 15, 1916.
3 SHEETS—SHEET 1.

Witnesses
V. C. Lindstrom.
C. M. Baumeister.

Inventor
Adolph W. H. Lenders
By Harry Lea Dodson.
Attorney

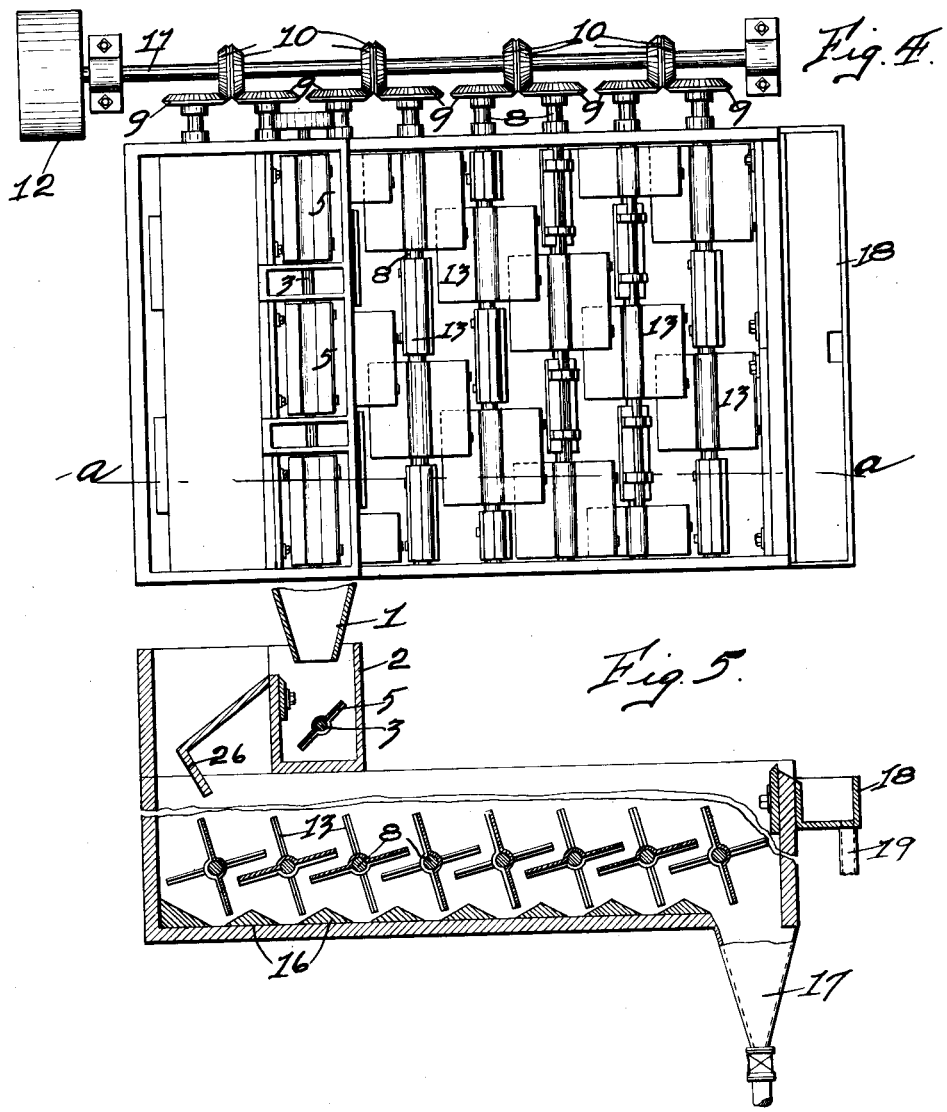

A. W. H. LENDERS.
GERM SEPARATOR.
APPLICATION FILED MAY 11, 1914.
1,194,399.
Patented Aug. 15, 1916.
3 SHEETS—SHEET 3.
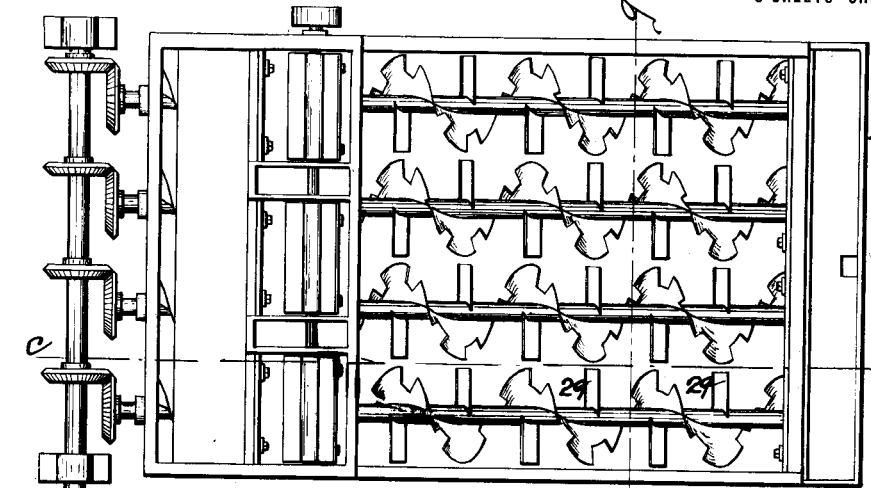
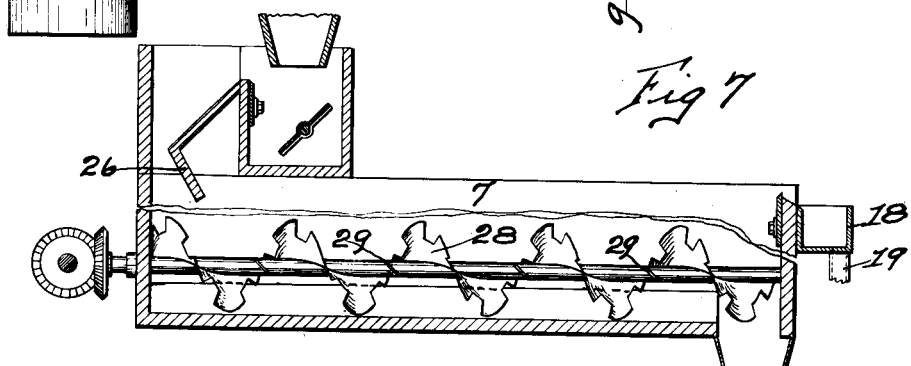
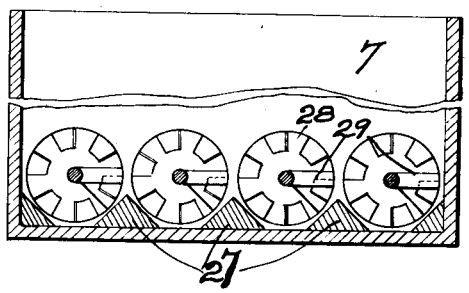
Witnesses
V. C. Lindstrom.
C. M. Baumeister.
Inventor
Adolph W. H. Lenders
By Harry Lea Dodson
Attorney

UNITED STATES PATENT OFFICE.

ADOLPH W. H. LENDERS, OF CEDAR RAPIDS, IOWA.

GERM-SEPARATOR.

1,194,399.  Specification of Letters Patent.  Patented Aug. 15, 1916.

Application filed May 11, 1914. Serial No. 837,626.

*To all whom it may concern:*

Be it known that I, ADOLPH W. H. LENDERS, a citizen of the United States, residing at Cedar Rapids, in the county of Linn and State of Iowa, have invented a certain new and useful Germ-Separator, of which the following is a specification.

My invention relates to that form of apparatus which is used in connection with the manufacture of starch, and which will greatly facilitate the act of separation.

In separating the germ from the corn, the corn is first placed in tanks known to the trade as steep tanks in which it is soaked in sulfurous acid water for the purpose of softening the corn, and rendering the germ tough and leathery, rather than brittle. After the corn has been soaked sufficiently long in the steep tanks, it is run through machines which crack or thresh the corn thereby loosening the germ from the starch, gluten, and hulls. The separation of the germ from the rest of the material is accomplished by utilizing the fact that there is a difference in the specific gravity between the germ and the starch, gluten and hulls, the germ being specifically lighter by reason of its oily content. As the cracked corn comes from the cracker or threshing machine, the entire mass is run into a body of starch liquor of a specific gravity varying from 7 to 12 Baumé, in which liquor owing to the fact that the germ is lighter than the liquor, the germ will rise to the surface while the other material sinks to the bottom. This process of separation, as employed in the past, has been continuously carried on in a vat usually twenty-two (22) to twenty-four (24) feet long, and about four (4) feet wide at the top and six (6) feet deep, tapering down to the bottom which is formed on a radius of about twelve (12) inches. A screw conveyer is located in the bottom which is formed in a plurality of arms arranged in a helix, the arms being separated so as to leave a space intermediate thereof. It will be apparent, therefore, that the tank is approximately three times as deep as the diameter of the screw conveyer. The rotation of this conveyer operates to break up and agitate the mass in the bottom of the separating vat; the corn entering the vat from the thresher, the greater part of the mass sinks to the bottom, the germ remaining on top. It frequently happens that the germ lodges in the heavier material and is deposited at the bottom of the vat, and the agitation is carried on with the idea of disturbing the mass so as to give the germ a chance to float, it passing along the top over-flowing at one end of the separating vat, which motion is assisted by means of a drag which consists of a plurality of chains having transverse rods secured thereto, and which are carried by sprockets which are slowly rotated so that the rod drags along at about the surface of the liquid thereby increasing the speed of travel of the germ. It frequently happens that in practice more or less germs are carried off by the conveyer in the bottom of the vat by reason of their being enveloped by heavy mass. It also happens at times that on account of the shape of the vat, a lot of the heavy mass builds up on the sides which stops the rising germ from reaching the surface. This is sought to be remedied by having the operator clean the sides of the vessel by means of a paddle. Whenever he does this while the separator is in operation, a lot of the germ is carried off enveloped in this mass by the conveyer. The space between the top of the conveyer and the surface of the liquid in the separator is about four (4) feet, therefore the germ has to travel this distance before reaching the surface. This also causes a loss of the germ because if the germ is not entirely separated from the hull or starch, a piece of the same adhering to it, the weight of the same will over-balance the difference between the specific gravity of the germ and the liquor, and keep it in suspension and it is carried off by the conveyer as it quickly becomes water-logged and sinks.

My invention has for its object to provide a separator which will contain none of the foregoing objectionable features, and one in which the starch liquor of the necessary Baumé will be comparatively shallow, for example, the water need only be ten inches above the top of the agitator. It will thus be seen that the depth of my tank is very shallow when it is compared to those used in the art, and therefore, when I use the term "shallow", I mean that the depth of water above the conveyer shall be such that the germ will rise to the surface of the liquid before it has time to become water-logged and sink. The result of this construction by providing a relatively short distance to travel to reach the top of the liquid is such that the germ will rise at once to the top of the liquid. The mass as it comes from the threshers is properly agitated thus giving the germ a chance to liberate itself and rise to the surface before it has a chance to become water-logged. I have proven in practice by careful examination of the heavier mass after it leaves the separator where my form of apparatus is used that not a single germ is found to have been carried off, and necessarily, therefore, not a single sinker or water-logged germ.

Apparatus for carrying out my invention is disclosed in the accompanying drawings which are furnished for illustrative purposes only, and not as indicating that this specific apparatus must be employed, the drawings being annexed to and made a part of this specification.

Figure 2:
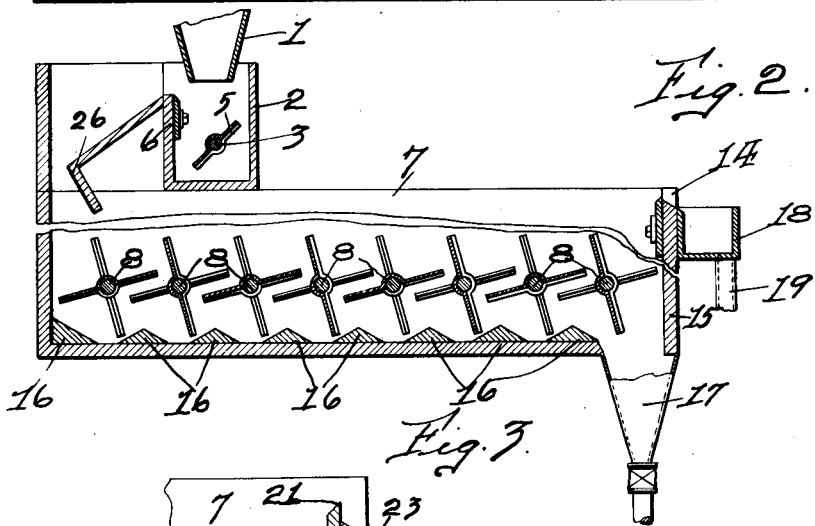
Figure 3:
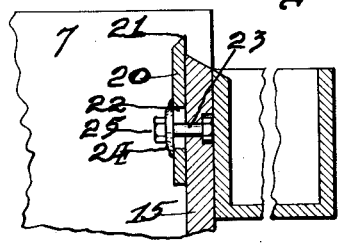

In the said drawings Figure 1, is a top or plan view of my improved separator, Fig. 2, is a cross-section taken on the lines $x$—$x$ in Fig. 1. Fig. 3, is a fragmentary detail view of the outlet for the germ. Fig. 4, is a top or plan view showing a modified arrangement of the agitators. Fig. 5, is a cross-section on the line $a$—$a$ in Fig. 4. Fig. 6, is a top or plan view showing a modified form of agitator. Fig. 7, is a sectional view taken on the line $c$—$c$ in Fig. 6. Fig. 8, is a sectional view taken on the line $g$—$g$ in Fig. 6.

Similar reference numerals refer to similar parts throughout the entire description.

As shown in the drawings, 1, is the discharge spout through which the mass comes from the threshers. This empties the material into a trough, 2, which is provided with a rotatable shaft 3, which may be driven by means of a belt (not shown) running on a pulley 4, which is secured to the end of the shaft 3. A plurality of paddles 5, are secured to this shaft and have the effect of agitating the mass and keeping it continuously in motion. From the trough 2, it overflows the side 6, and empties into my improved separator 7, over my improved distributer or equalizer 26. It is necessary that the surface of the liquid be undisturbed and quiet. This makes it necessary to have the agitators sufficient below the surface so as to provide a plane of quiet liquor. It is also found desirable to extend the distributer or equalizer 26 below the surface of the liquor, as in this manner I avoid causing ripples on the surface due to the entrance of the incoming mass. This separator 7 consists of a comparatively shallow tank only eighteen (18) inches deep inside.

A plurality of transverse shafts 8, are mounted in the tank, these shafts being driven through the medium of bevel gears 9, which are in mesh with and driven by bevel pinions 10, mounted upon a shaft 11, which is driven through a pulley 12, by means of any suitable power (not shown). Each of the shafts 8, have mounted thereon a plurality of paddles 13. These paddles are preferably six (6) inches in diameter. An outlet 14 for the germ overflow is provided at one end of the tank 7, and is notched into the side wall 15 thereof about one and one-half ($1\frac{1}{2}''$) inches from the top. It will be obvious that when you provide a clearance for the paddles from the bottom of the tank that it will leave only about ten (10'') inches of liquor for the germ to rise through.

A plurality of ridges 16, are located on the bottom of the trough intermediate the paddles, the construction and movement of the paddles being such that each paddle scoops the mass in the bottom up over the ridge 16, which is caught by the next adjacent paddle in front, which scoops it up again and passes on with the result that during this movement the mass is constantly agitated and the germ is thus given a thorough chance to liberate itself and rise to the surface which action takes place very quickly through the comparatively shallow body of liquid. The starch, gluten and hulls escape through a plurality of discharge openings 17 while the germ overflows into a trough 18, which is provided with an outlet 19.

In Fig. 3, I have shown a means for varying the height of the germ overflow. As shown, it comprises a board 20, the edge of which is beveled to a knife point 21, and which is provided with a plurality of slots 22, through which projects a bolt 23, which is provided with a washer 24, and nut 25. It will be apparent from this that by loosening the nut the board 20, can be either raised or lowered to the desired position.

In Figs. 4 and 5, I have shown substantially the same apparatus with the single exception that in these figures the paddles instead of being in longitudinal alinement are staggered as clearly seen in the plan view, Fig. 4. It may be found desirable to use this form of construction if there appears to be a necessity to still more effectually agitate the mass.

In Figs. 6, 7 and 8, I have shown a different style of agitator which, as shown, comprises a plurality of cut-flight conveyers 28, extending longitudinally of the tank 7, the ridges 27 in this form of construction extending longitudinally of the tank and intermediate the said conveyers. These cut-flight conveyers are preferably equipped with mixing paddles 29. As is known, this form of conveyer is exceptionally desirable where it is necessary to thoroughly agitate the mass while passing through a comparatively short distance, as the mixing paddle throws the mass back against the flight of the conveyer, thus keeping it continuously in a state of agitation. It will be apparent that this is but another form of utilizing my invention, which essentially consists in utilizing a comparatively shallow tank and carrying the mass forward from the time of its entrance to its egress, at the same time keeping it continuously agitated during the said passage.

I have demonstrated in practice that with this apparatus only six (6′) feet in length, it is possible to have the same separating capacity as one of the old tanks twenty-two (22′) and twenty-four (24′) feet long, with the same width of four (4′) feet and I have proven in my demonstration that it is nearly if not quite impossible to lose any floatable germ where this apparatus is employed.

Having described my invention what I regard as new, and desire to secure by Letters Patent is:

1. The method of separating germs which consists of causing the cracked corn to pass through a shallow body of liquid of from 7 to 13% Baumé alternately elevating and releasing the solid mass in its passage whereby the germ is liberated and floats off from the top of the liquor while the starch, gluten and hulls are carried off at the bottom.

2. The method of separating germs which consists of causing the cracked corn to pass through a shallow body of liquid of from 7 to 13% Baumé in a different mass on the bottom of the liquid keeping the said mass continuously in agitation during its passage whereby the germ is liberated and floats off from the top of the liquor while the starch, gluten and hulls are carried off at the bottom.

3. The method of separating substances which consists of passing them through a shallow body of liquid, the specific gravity of which is heavier than one and lighter than some of the substances, agitating the mass, whereby the lighter substance is freed from the mass and flows off of the top of the liquid, while the heavier substances are carried off at the bottom.

4. The method of separating substances which consists of passing them through a shallow body of liquid, the surface of which is maintained undisturbed, the specific gravity of which is heavier than one and lighter than some of the substances, agitating the mass, whereby the lighter substance is freed from the mass and flows off of the top of the liquid, while the heavier substances are carried off at the bottom.

5. The method of separating substances which consists of introducing them into a shallow body of liquid adjacent one edge, the specific gravity of said liquid being heavier than one and lighter than the other substances, carrying the mass from the point of entrance to the opposite edge of the body of liquid, and agitating the mass during said passage whereby the lighter substance is freed from the mass and flows off of the top of the liquid, while the heavier substances are carried off at the bottom.

6. The method of separating substances which consists of introducing them into a shallow body of liquid adjacent one edge, the specific gravity of said liquid being heavier than one and lighter than the other substances, carrying the mass from the point of entrance to the opposite edge of the body of liquid, and agitating the mass during said passage whereby the lighter substance is freed from the mass and flows off of the top of the liquid, while the heavier substances are carried off at the bottom without disturbing the surface of the liquid.

7. The method of separating substances which consists of introducing them into a shallow body of liquid without disturbing the surface thereof, carrying the mass of substances from the point of entrance to the opposite edge of the body of liquid, without agitating the mass during said passage and maintaining the surface of the liquid undisturbed at all times, the specific gravity of said liquid being heavier than one substance and lighter than the others, conveying the lighter substances from the top of the liquid, while the heavier substances are carried off at the bottom.

In testimony whereof, I have signed the foregoing specification.

ADOLPH W. H. LENDERS.

Witnesses:
A. M. DOUGLAS,
R. W. BLACK.